(12) United States Patent
Jiang et al.

(10) Patent No.: US 10,564,858 B2
(45) Date of Patent: Feb. 18, 2020

(54) DATA STORAGE DEVICE WITH SELECTIVE CONNECTION TO NON-VOLATILE MEMORIES

(71) Applicant: Nyquist Semiconductor Limited, Grand Cayman (KY)

(72) Inventors: Wei Jiang, Fremont, CA (US); Jie Chen, Milpitas, CA (US); Chiahung Chien, Dublin, CA (US); Lin Chen, Cupertino, CA (US); Zining Wu, Los Altos, CA (US)

(73) Assignee: Nyquist Semiconductor Limited, Grand Cayman (KY)

( * ) Notice: Subject to any disclaimer, the term of this patent is extended or adjusted under 35 U.S.C. 154(b) by 0 days.

(21) Appl. No.: 15/969,278

(22) Filed: May 2, 2018

(65) Prior Publication Data
US 2019/0339880 A1 Nov. 7, 2019

(51) Int. Cl.
*G06F 3/06* (2006.01)
*G06F 13/28* (2006.01)
*H04L 29/08* (2006.01)

(52) U.S. Cl.
CPC .......... *G06F 3/0613* (2013.01); *G06F 3/0659* (2013.01); *G06F 3/0683* (2013.01); *G06F 13/28* (2013.01); *H04L 69/323* (2013.01)

(58) Field of Classification Search
CPC ............................ G06F 3/0659; G06F 3/0683
See application file for complete search history.

(56) References Cited

U.S. PATENT DOCUMENTS

| | | | |
|---|---|---|---|
| 2016/0179388 A1* | 6/2016 | Huang | G06F 13/1668 711/103 |
| 2017/0139865 A1* | 5/2017 | Liao | G06F 13/4022 |
| 2019/0138390 A1* | 5/2019 | Fisher | G06F 11/1068 |

* cited by examiner

*Primary Examiner* — Zachary K Huson
(74) *Attorney, Agent, or Firm* — Vista IP Law Group, LLP

(57) ABSTRACT

An apparatus includes: a first memory controller that corresponds with a first type of non-volatile memory device; a second memory controller that corresponds to a second type of non-volatile memory device, wherein the second type of non-volatile memory device is different from the first type of non-volatile memory device; an physical layer (PHY) interface; and an interface controller coupled to the PHY interface for controlling signal transmission by the PHY interface; wherein the PHY interface is selectively configurable or is user-configured to allow the PHY interface to communicate with one or more memory devices belonging to the first type, the second type, or both.

35 Claims, 11 Drawing Sheets

DATA STORAGE DEVICE WITH SELECTIVE CONNECTION TO NON-VOLATILE MEMORIES

FIELD

The field of the application relates to supporting different high-speed non-volatile memory interfaces with a selective interface and associated methods.

BACKGROUND

In high performance computer systems, there are different types of high speed non-volatile memory interfaces such as NAND (toggle or ONFI) interfaces for NAND memory devices, and 3D XPoint interfaces for 3D XPoint memory devices. Due to the high-speed nature of these interfaces, a hard macro approach may be used to implement the physical layer (PHY) for interaction with each of these types of interfaces. Computer systems may support either NAND or 3D XPoint, depending on cost, performance, and market requirements, but not both at the same time.

New storage devices, systems containing the capability to support different non-volatile memories with a single PHY, and associated methods of operation are described herein.

SUMMARY

An apparatus includes: a first memory controller that corresponds with a first type of non-volatile memory device; a second memory controller that corresponds to a second type of non-volatile memory device, wherein the second type of non-volatile memory device is different from the first type of non-volatile memory device; an physical layer (PHY) interface; and an interface controller coupled to the PHY interface for controlling signal transmission by the PHY interface; wherein the PHY interface is selectively configurable or is user-configured to allow the PHY interface to communicate with one or more memory devices belonging to the first type, the second type, or both.

Optionally, the PHY interface comprises pins that are selectively assignable or selectively assigned to operate as a type of pin specific to the first type of non-volatile memory device, or to the second type of non-volatile memory device.

Optionally, the PHY interface comprises registers configured to allow functionalities of pins of the PHY interface to be programmed.

Optionally, the interface controller is configured to control the signal transmission by the PHY interface based on a manner in which pins of the PHY interface is configured.

Optionally, the apparatus further includes a switch or a multiplexer coupled to the interface controller, wherein the interface controller is configured to control the switch or the multiplexer.

Optionally, the first type of non-volatile memory device is a NAND memory device.

Optionally, the second type of non-volatile memory device is a 3D XPoint memory device.

Optionally, the PHY interface comprises a plurality of channels that are selectively configurable or configured.

Optionally, the first memory controller, the second memory controller, and the PHY interface are integrated into an integrated circuit (IC) chip.

Optionally, the one or more memory devices comprise a 3D XPoint memory device, a NAND memory device, or both.

A system includes the apparatus, and the one or more memory devices.

Optionally, the one or more memory devices comprise a 3D XPoint memory device, a NAND memory device, or both.

Optionally, the one or more memory devices are connected to the PHY interface via electrical connections, such as bonding or bumping. The electrical connection is not necessarily limited to bonding or bumping, and may be implemented using other types of electrical connection. In other embodiments, an electrical connection may be implemented using a mechanical connector that allows a memory device to detachably couple to the PHY interface.

An apparatus includes: a first memory controller that corresponds with a first type of non-volatile memory device; a second memory controller that corresponds to a second type of non-volatile memory device, wherein the second type of non-volatile memory device is different from the first type of non-volatile memory device; an physical layer (PHY) interface; and an interface controller coupled to the PHY interface for controlling signal transmission by the PHY interface; wherein the interface controller is configured to control signal transmission by the PHY interface based on a manner in which pins of the PHY interface is configured by a user.

Optionally, the PHY interface comprises pins that are selectively assignable or selectively assigned to operate as a type of pin specific to the first type of non-volatile memory device, or to the second type of non-volatile memory device.

Optionally, the PHY interface comprises registers configured to allow functionalities of pins of the PHY interface to be programmed.

Optionally, the apparatus further includes a switch or a multiplexer coupled to the interface controller, wherein the interface controller is configured to control the switch or the multiplexer.

Optionally, the first type of non-volatile memory device is a NAND memory device.

Optionally, the second type of non-volatile memory device is a 3D XPoint memory device.

Optionally, the PHY interface comprises a plurality of channels that are selectively configurable or configured.

Optionally, the first memory controller, the second memory controller, and the PHY interface are integrated into an integrated circuit (IC) chip.

Optionally, the pins of the PHY interface is configured by the user to communicate with one or more memory devices.

Optionally, the one or more memory devices comprise a 3D XPoint memory device, a NAND memory device, or both.

A system includes the apparatus, and the one or more memory devices.

Optionally, the one or more memory devices comprise a 3D XPoint memory device, a NAND memory device, or both.

Optionally, the one or more memory devices are connected to the PHY interface via electrical connections.

A method performed by an apparatus, includes: receiving an electronic signal from a memory controller; determining a signal type for the electronic signal; determining one or more pins of a physical layer (PHY) interface of the apparatus that are assigned to receive the electronic signal based on the determined signal type; and passing the electronic signal to the one or more pins of the PHY interface.

Optionally, the electronic signal comprises a read command or a write command.

Optionally, the act of determining the one or more pins comprises determining a channel associated with the PHY interface that is assigned to implement a certain type of pin function for a memory device, wherein the one or more pins belong to the channel.

Optionally, the electronic signal is for communication with a non-volatile memory device.

Optionally, the non-volatile memory device comprises a NAND memory device or a 3D XPoint memory device.

Other and further aspects and features will be evident from reading the following detailed description.

DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only exemplary embodiments and are not therefore to be considered limiting in the scope of the claims.

DETAILED DESCRIPTION

Figure 1:
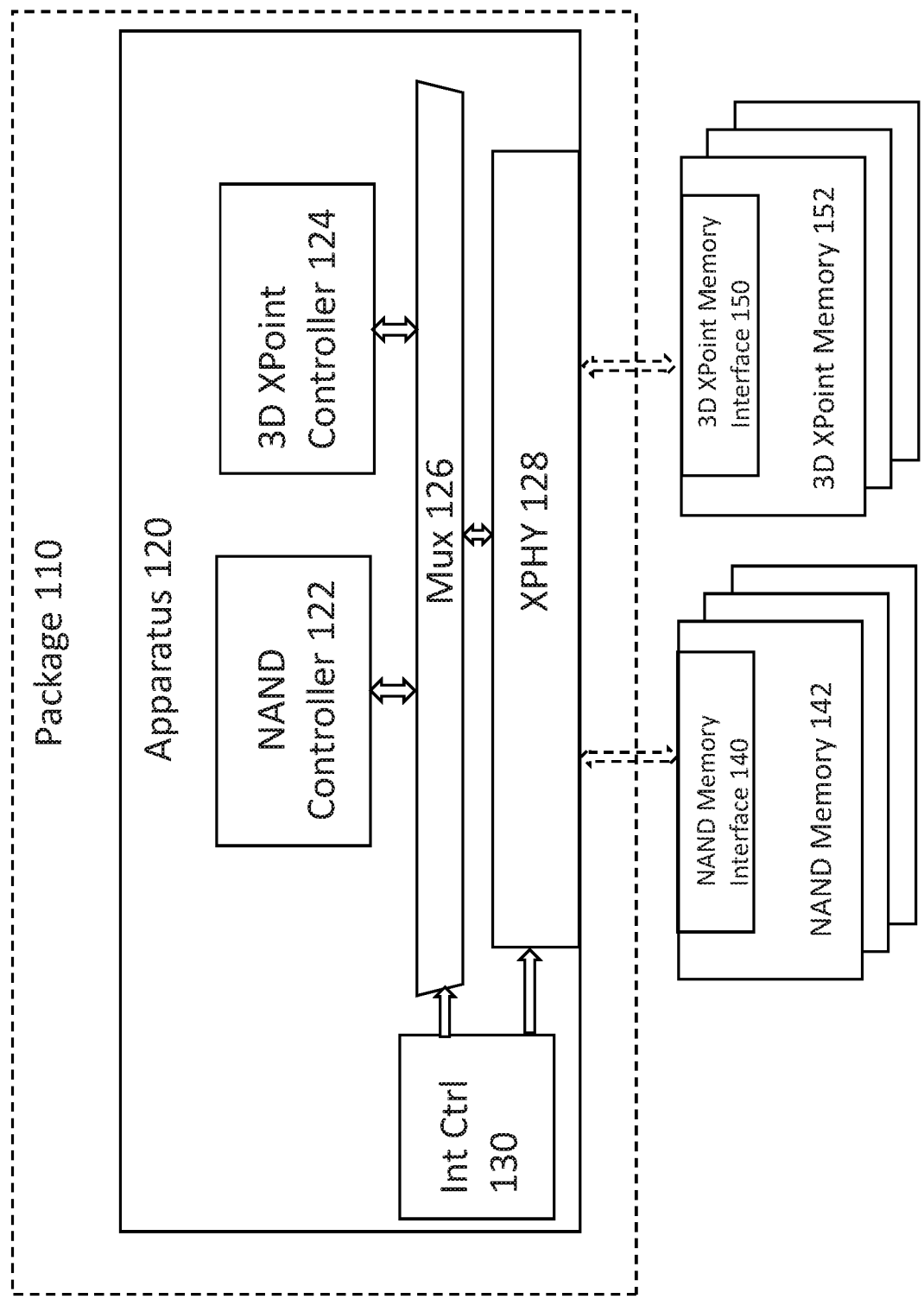
FIG. 1 illustrates an apparatus with a configurable PHY interface for selective communication with one or more types of memory devices.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates an apparatus 120 configured to function as an interface for allowing a product (that incorporates the apparatus 120) to communicate with one or more types of memory devices. As shown in the figure, the apparatus 120 includes a NAND memory controller 122, a 3D XPoint memory controller 124, a multiplexer (mux) 126, a physical layer (PHY) interface 128, and an interface controller 130. The apparatus 120 may be selectively connected (as indicated by the dashed arrows in the figure) to one or more NAND memory device(s) 142 via respective NAND memory interface(s) 140, and/or to one or more 3D XPoint memory device(s) 152 via respective 3D XPoint memory interface(s) 150. The PHY interface 128 is selectively configurable to allow the NAND memory controller 122 and the NAND memory device(s) 142 to communicate with each other, and/or to allow the 3D XPoint memory controller 124 and the 3D XPoint memory device(s) to communicate with each other.

The interface controller 130 is configured to operate the multiplexer 126 and/or the PHY interface 128 based on configuration of the PHY interface 128 as configured by a user of the apparatus 120. For example, if the user connects a NAND memory device 142 to certain pins of the PHY interface 128, and assigns such pins for communication with the NAND memory device 142, then the interface controller 130 may operate the multiplexer 126 and/or the PHY interface 128 based on such pin assignment so that the NAND memory controller 122 and the NAND memory device 142 can communicate with each other. As another example, if the user connects a 3D XPoint memory device 152 to certain pins of the PHY interface 128, and assigns such pins for communication with the 3D XPoint memory device 152, then the interface controller 130 may operate the multiplexer 126 and/or the PHY interface 128 based on such pin assignment so that the 3D XPoint memory controller 124 and the 3D XPoint memory device 152 can communicate with each other. As used in this specification, the term "pin" refers to any electrical part for making a connection, such as a contact, a pad, etc., and may have any shape and form. Thus, the term "pin" is not necessarily limited to an electrical part that is elongated in shape.

It should be noted that the term "user", as used in this specification, is not necessarily limited to an end user, and may refer to any entity (e.g., human, company, organization, etc.) that makes, handles, provides, operates, etc., the apparatus 120. In one example, the user may be a manufacturer that acquires the apparatus 120, and selectively connects the apparatus 120 to one or more types of memory device(s), for the purpose of making a product or a component of a product.

In one implementation, the apparatus 120 may be a system-on-a-chip (SoC). A SoC can integrate a complex system into a single chip and achieve lower power, lower cost and higher speed than the traditional board level design. Also, in some embodiments, the apparatus 120 may be implemented on a single die. In other embodiments, the apparatus 120 may be implemented using other techniques, and may be any types of integrated circuit. In some embodiments, that apparatus 120 may be a part of package or product 110 (e.g., a system-in-package) designed with the apparatus 120 being connected to one or more types of different memory devices. In other embodiments, the apparatus 120 may be provided as a component, so that a user of the apparatus 120 may selectively incorporate the apparatus 120 as a component of a system design.

In the illustrated embodiment of FIG. 1, the apparatus 120 has two types of memory controller. In other embodiments, the apparatus 120 may have more than two types of memory controller for allowing the apparatus 120 to be selectively configurable to support more than three types of memory devices. The memory controller 122/124 facilitates the access of memory modules. The memory controller 122/124 transmits a host of signals to the memory including address signals, control signals, clock signals, etc. to access data from the memory or to send data to the memory. In addition, memory controllers also translate simple read and write requests into the complex series of commands required by the memory interfaces. In some embodiments, the memory controller 122/124 may arbitrate and prioritize between several functional blocks on the SoC 120, which contend for access to the off-chip memory devices 142 and 152. The memory devices may include Flash type non-violate memory device(s) such as the NAND memory device(s) 142, or another type of non-violate memory such as the 3D XPoint memory devices 152.

The NAND memory controller 122 provides an interface to access NAND Memory device(s) 142 by handling data transactions between the SoC 120 and the NAND memory device(s) 142 via the NAND interface(s) 140. The NAND memory controller 122 is configured to perform a variety of functions that may include logical-to-physical address translation, Error Correction Coding, bad-block management, management of multiple NAND memory devices, communication with a host system, and other functions. The NAND memory controller 122 is functionally located between the NAND memory device(s) 142 and a host so that the host can access the NAND memory device(s) 142 through the NAND memory controller 122. The NAND memory controller 122 may be formed as a dedicated chip, an Application Specific Integrated Circuit that is designed to perform particular functions needed in a particular memory system.

Similarly, the 3D XPoint memory controller 124 provides an interface to access the 3D XPoint memory device(s) 152 via the 3D XPoint interface(s) 150. 3D XPoint memory devices use a double data rate (DDR)-like Interface with dynamic random access memory (DRAM) support. The 3D XPoint memory controller 124 is functionally located between the 3D XPoint memory device(s) 152 and a host so that the host accesses the 3D XPoint memory device(s) 152 through the 3D XPoint memory controller 124. The 3D XPoint memory controller 124 may be formed as a dedicated chip, an Application Specific Integrated Circuit that is designed to perform particular functions needed in a particular memory system.

The PHY interface 128 is a physical interface between the memory devices and the system communicating with such memory devices. In some cases, the PHY interface 128 may be a physical layer of the Open Systems Interconnection (OSI) model that refers to circuitry and/or coding involved to implement physical layer functions. In some embodiments, the PHY interface 128 may include both physical coding sublayer and physical medium dependent layer functionality. As discussed, the PHY interface 128 is selectively configurable to support NAND memory device(s), and/or 3D XPoint memory device(s). The PHY interface 128 can be flexibly configured to support the different pin counts and arrangements for the NAND and 3D XPoint memory interfaces. As such, each pin of the PHY interface 128 can support multiple protocols through pin assignment, and can be assigned as any functional pin for a selected type of memory device. Furthermore, the PHY interface 128 may be designed so that it can operate across all different voltage ranges needed to serve both memory interface protocols (e.g., NAND at 1.8V and 1.2V and 3D XPoint at 1.2 V). In some embodiments, the supporting logic for different protocols such as serializer/de-serializer, output phase alignment control, input sampling scheme, different driver/receiver controls, etc., may be designed into the PHY interface 128 and selectable by the different register settings.

In some embodiments, the configuring of the PHY interface 128 may involve the interface controller 130. In some cases, the interface controller 130 may include register(s) functioning as a latch to store commands. The interface controller 130 may also be configured to process address and data information for executing commands. During use, the configuration of the PHY interface 128 may be programmed using the interface controller 130. For example, the interface controller 130 may configure the PHY interface 128 into a first mode to allow the PHY interface 128 to communicate with the NAND memory interface 140 of the NAND memory device 142, a second mode to allow the PHY interface 128 to communicate with the 3D XPoint memory interface 150 of the 3D XPoint memory device 152, or a third mode to allow the PHY interface 128 to communicate with both the NAND memory interface 140 and the 3D XPoint memory interface 150. Based on the mode selected, the interface controller 130 then operates the multiplexer 126 to allow communication with the NAND memory controller 12, the 3D XPoint memory controller 124, or both.

Also, in some embodiments, the configuring of the PHY interface 128 may involve assigning generic pins of the PHY interface 128 as functional pins that are specific to a certain type of memory device. In some cases, the pin assignment may be accomplished by defining channels and/or sub-channels, with each sub-channel have a certain number of pins. A sub-channel may then be assigned to implement a certain pin function that is specific to the memory device. In some embodiments, the channel and sub-channel definition, and the channel and pin assignments may be stored in a medium associated with the interface controller 130. During use, the interface controller 130 operates the multiplexer 126 and the PHY 128 to pass signals transmitted between a memory controller (e.g., NAND memory controller 122, 3D XPoint memory controller 124, etc.) and a memory device (e.g., NAND memory device 142, 3D XPoint memory device 152, etc.) based on the channel and pin assignments. For example, if pin number 4 in sub-channel 6 of the PHY interface 128 is assigned to be a data pin for a NAND memory device, then when data is being transmitted between the NAND memory controller 122 and the NAND memory interface 140, the interface controller 130 will operate the multiplexer 126 and the PHY interface 128 to cause the data to be transmitted via pin number 4 in sub-channel 6 of the PHY interface 128.

Figure 2A:
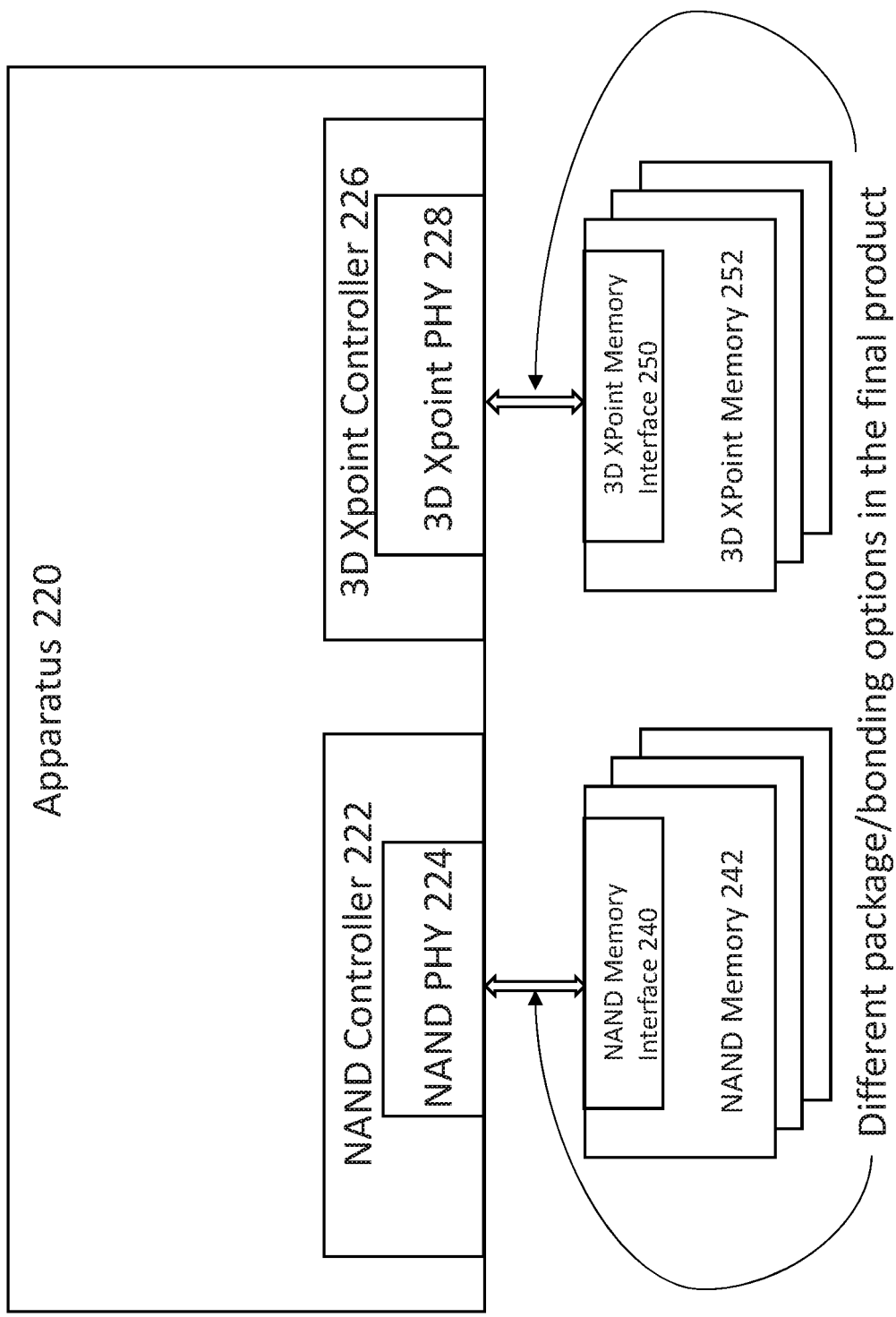
FIG. 2A illustrates a system having different PHY interfaces for different types of memory devices.

The apparatus 120 of FIG. 1 with the PHY interface 128 supporting multiple types of memory devices is advantageous over a design that uses separate PHYs supporting separate types of memory devices. As an example for comparison, FIG. 2A illustrates a system configured to support multiple types of memory interfaces using two distinct and separate PHY interfaces 224, 228. As shown in FIG. 2, the system can support two different types of non-volatile memory devices—e.g., NAND memory device(s) 242 and 3D XPoint memory device(s) 252, by using a NAND memory controller 222 and a 3D XPoint memory controller 226 implemented in a side-by-side configuration on a SoC 220. In this configuration, that there are two distinct and separate PHY interfaces 224 and 228 for respective different types of memory devices. The PHY interface 224 has corresponding channels for communication with the NAND memory device(s) 242. Similarly, the PHY interface 228 has corresponding channels for communication with the 3D XPoint memory device(s) 252.

One drawback of the system of FIG. 2A is that different package and bonding options will be needed to implement the final product. As explained above, due to the high-speed nature of NAND and 3D XPoint interfaces, a hard macro may be used for the PHY interfaces associated with these memory devices. A computer system may only need to support either NAND memory device or 3D XPoint, and not both types of memory devices. As such, to reduce development and manufacture costs, a computer system may only have a few PHY interfaces for NAND memory device(s), and only a few PHY interface(s) for 3D XPoint memory device(s).

Figure 2B:
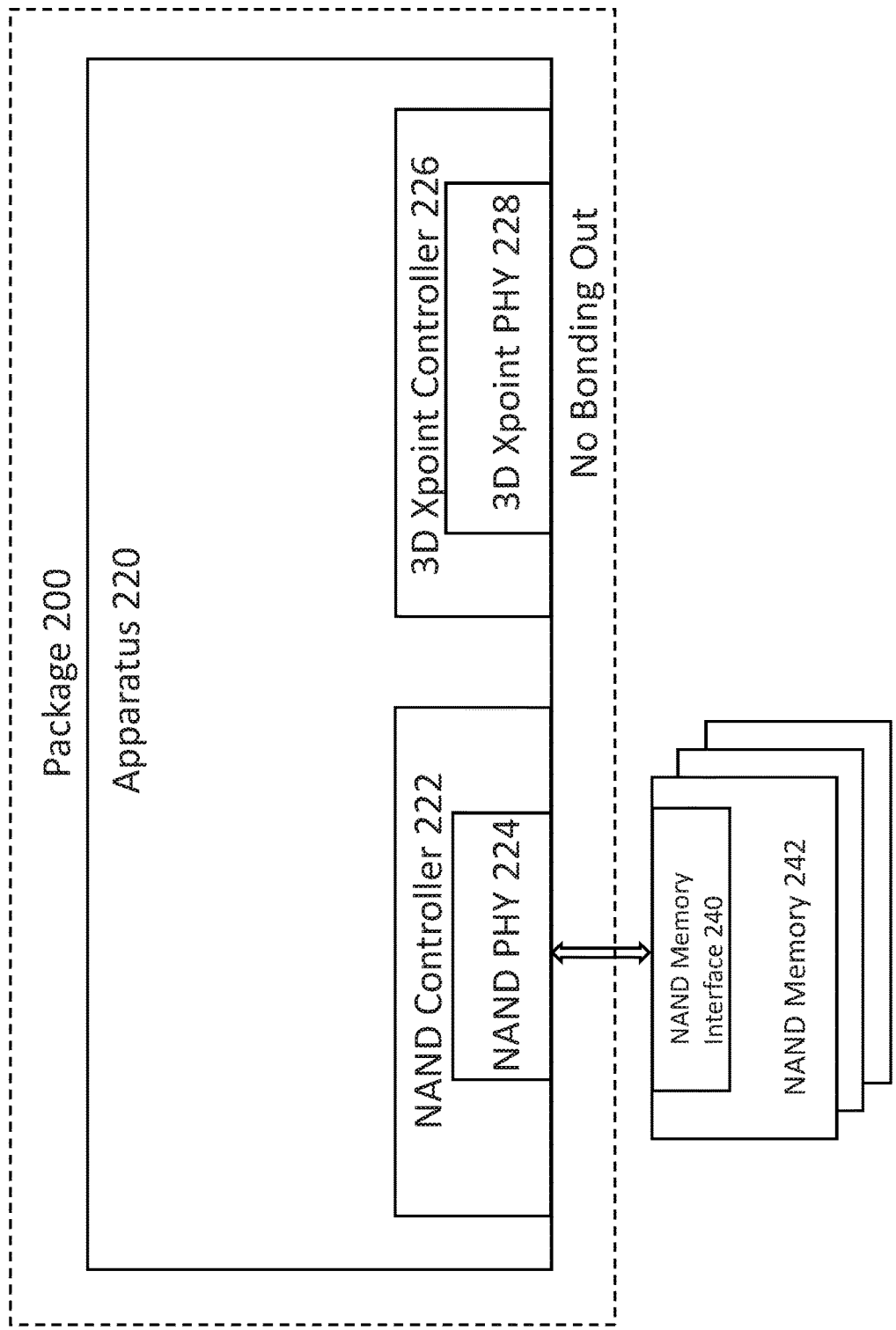
FIG. 2B illustrates the system of FIG. 2A, particularly showing the system specifically configured to communicate with only NAND memory device(s).

The system of FIG. 2A may be used with NAND memory devices 240. FIG. 2B shows an example of such. As shown in the figure, the final product 220 has been specifically configured to only support NAND memory device 242. As such, there is no bonding out for the 3D XPoint PHY interface 228. Accordingly, the layout space for the 3D XPoint controller 226 and the 3D Xpoint PHY interface 228 are wasted in the example. In addition, having two different types of PHY interfaces 224, 228 makes it very expensive as the die size needs to be increased to accommodate any un-used PHY/IOs die area (e.g., those associated with 3D XPoint controller 226 and 3D XPoint PHY interface 228 in the example shown).

Figure 2C:
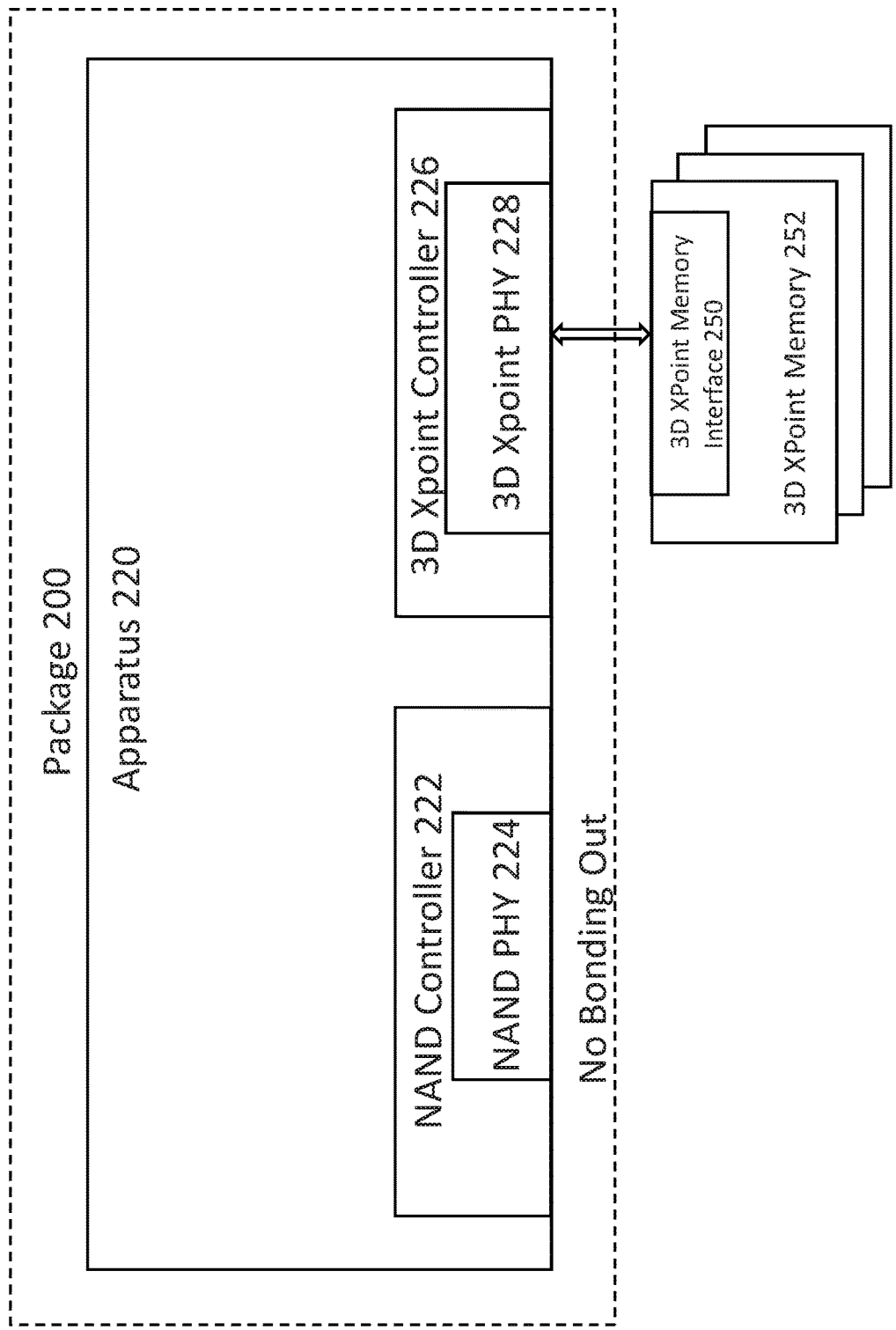
FIG. 2C illustrates the system of FIG. 2A, particularly showing the system specifically configured to communicate with only 3D XPoint memory device(s).

Similarly, the system of FIG. 2A may be used with 3D XPoint memory devices 252. FIG. 2C shows an example of such. As shown in the figure, the final product 220 has been specifically configured to only support 3D XPoint memory device 252. As such, there is no bonding out for the NAND PHY interface 224. Accordingly, the layout space for the NAND controller 222 and the NAND PHY interface 224 are wasted in the example. In addition, having two different types of PHY interfaces 224, 228 makes it very expensive as the die size needs to be increased to accommodate any un-used PHY/IOs die area (e.g., those associated with NAND controller 222 and NAND PHY interface 224 in the example shown).

Returning to FIG. 1, the system 110 may be selectively used with NAND memory device(s), 3D XPoint memory device(s), or both. The system 110 of FIG. 1 is advantageous compared to the system 220 of FIGS. 2B-2C, because regardless of how the final product is configured, the same PHY interface will be used, and there is no waste of layout space associated with the implementation of the PHY interface.

Figure 3A:
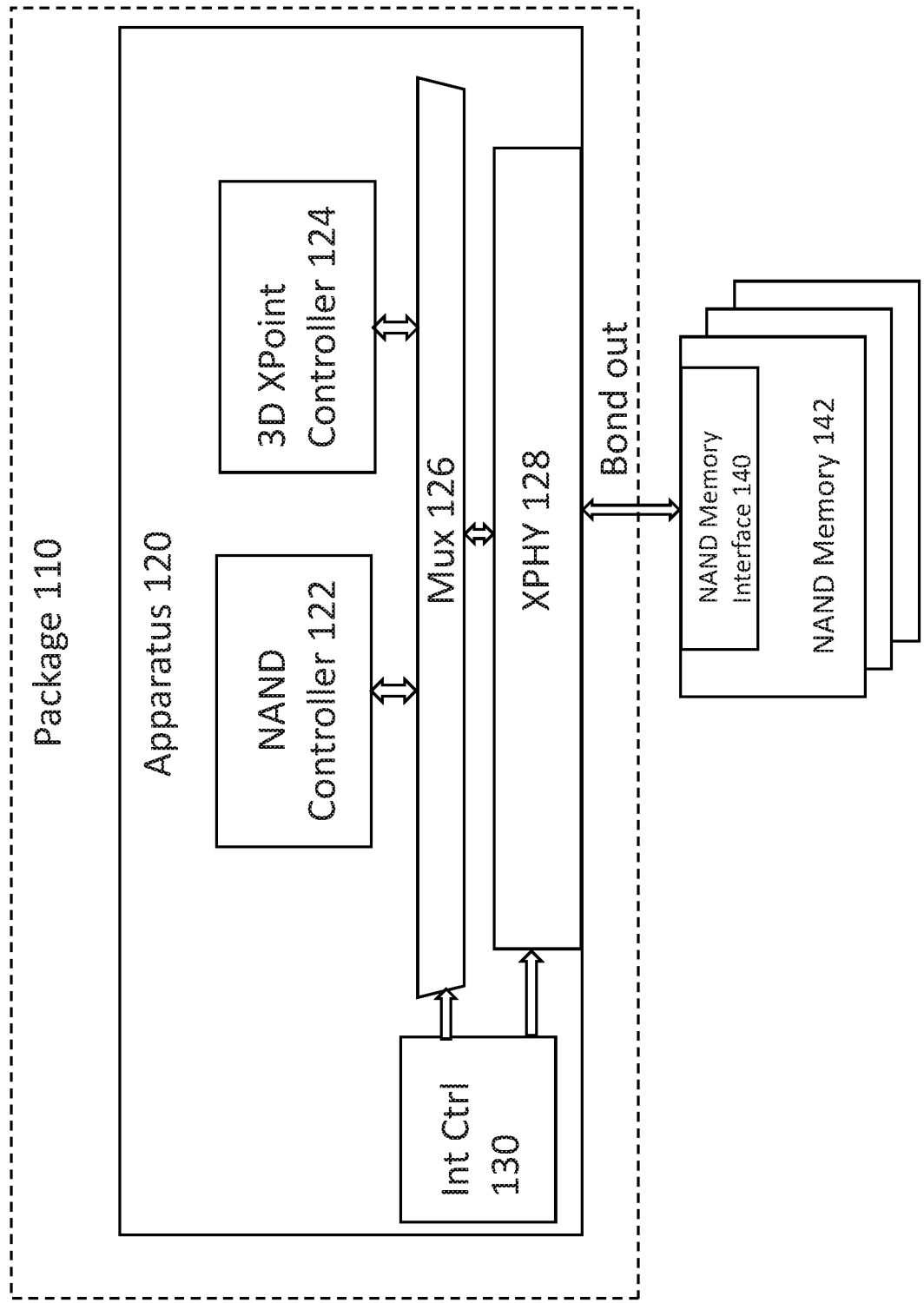
FIG. 3A illustrates the system of FIG. 1, particularly showing the system being used with NAND memory device(s).

For example, the system of FIG. 1 may be selectively used with NAND memory device(s) 142. FIG. 3A shows an example of such. As shown in the figure, the product 110 is specifically configured to communicate with NAND memory device(s) 142. The interface controller 130 configures the PHY interface 128 (e.g., through registers) so that it is compatible with the NAND memory device(s) 142. The interface controller 130 also controls multiplexer 126 to select the NAND memory controller 122 for controlling the NAND memory device(s) 142. In some embodiments, the PHY interface 128 is selectively configured through registers in the interface controller 130, so that the NAND memory controller 122 can communicate with the NAND memory device(s) 142 via the multiplexer 126 and the PHY interface 128. In other embodiments, instead of using the multiplexer 126, the system may use a switch that is selectively operated to connect the NAND memory controller 122 and/or the 3D XPoint memory controller 124 with the PHY interface 128. As shown in the example, because the PHY interface 128 is selectively configurable to support multiple types of memory devices, it is used no matter which type of memory device is selected for use with the system, and there is no waste of layout space associated with the implementation of the PHY interface 128.

Figure 3B:
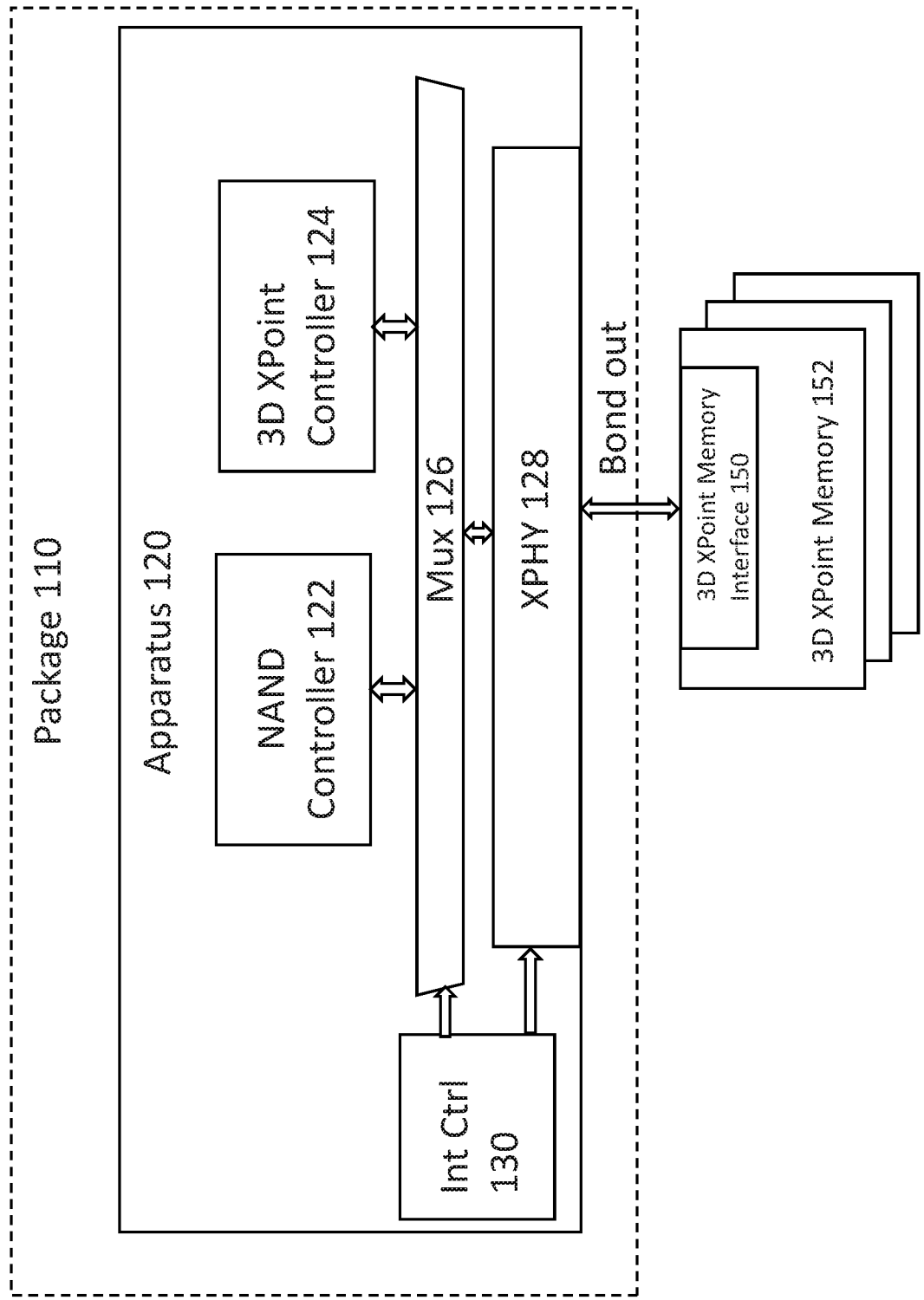
FIG. 3B illustrates the system of FIG. 1, particularly showing the system being used with 3D XPoint memory device(s).

Similarly, the system of FIG. 1 may be selectively used with 3D XPoint memory device(s) 152. FIG. 3B shows an example of such. As shown in the figure, the product 110 is specifically configured to communicate with 3D XPoint memory device(s) 152. The interface controller 130 configures the PHY interface 128 (e.g., through registers) so that it is compatible with the 3D XPoint memory device(s) 152. The interface controller 130 also controls multiplexer 126 to select the 3D XPoint memory controller 124 for controlling the 3D XPoint memory device(s) 152. In some embodiments, the PHY interface 128 is selectively configured through registers in the interface controller 130, so that the 3D XPoint memory controller 124 can communicate with the 3D XPoint memory device(s) 152 via the multiplexer 126 and the PHY interface 128. In other embodiments, instead of using the multiplexer 126, the system may use a switch that is selectively operated to connect the NAND memory controller 122 and/or the 3D XPoint memory controller 124 with the PHY interface 128. As shown in the example, because the PHY interface 128 is selectively configurable to support multiple types of memory devices, it is used no matter which type of memory device is selected for use with the system, and there is no waste of layout space associated with the implementation of the PHY interface 128.

Figure 3C:
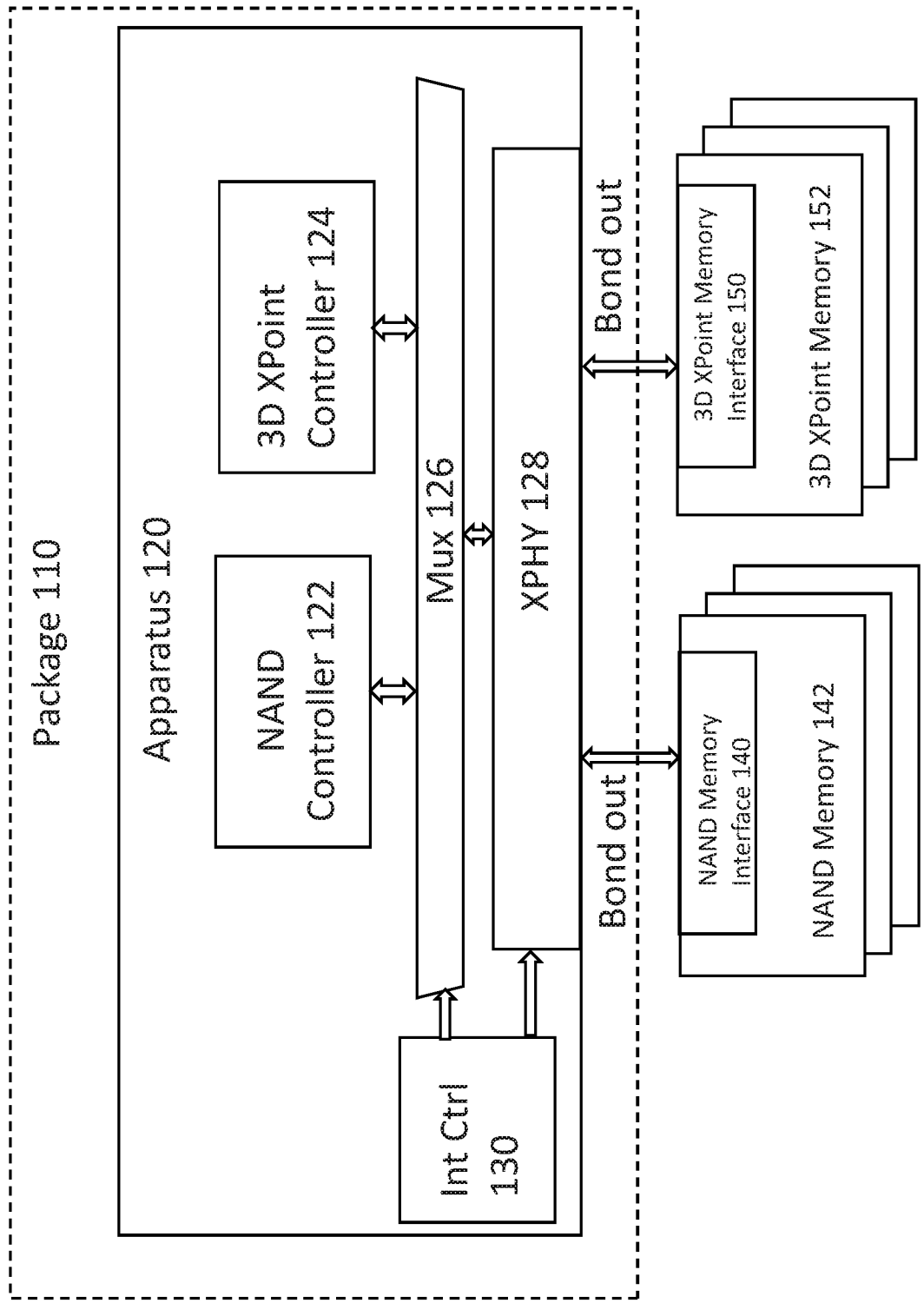
FIG. 3C illustrates the system of FIG. 1, particularly showing the system being used with both NAND memory device(s) and 3D XPoint memory device(s).

The system of FIG. 1 may also be selectively used with both NAND memory device(s) 142 and 3D XPoint memory device(s) 152. FIG. 3C shows an example of such. As shown in the figure, the product 110 is specifically configured to communicate with both NAND memory device(s) 142 and 3D XPoint memory device(s) 152. The interface controller 130 configures the PHY interface 128 (e.g., through registers) so that it is compatible with both the NAND memory device(s) 142 and the 3D XPoint memory device(s) 152. The interface controller 130 also controls multiplexer 126 to select both the NAND memory controller 122 and the 3D XPoint memory controller 124 for respectively controlling the NAND memory device(s) 142 and the 3D XPoint memory device(s) 152. In some embodiments, the PHY interface 128 is selectively configured through registers in the interface controller 130, so that the NAND memory controller 122 can communicate with the NAND memory device(s) 142, and so that the 3D XPoint memory controller 124 can communicate with the 3D XPoint memory device(s) 152, via the multiplexer 126 and the PHY interface 128. In other embodiments, instead of using the multiplexer 126, the system may use a switch that is selectively operated to connect the NAND memory controller 122 and/or the 3D XPoint memory controller 124 with the PHY interface 128. As shown in the example, because the PHY interface 128 is selectively configurable to support multiple types of memory devices, the system does not need to have separate PHY interfaces for respectively different types of memory devices.

As shown in FIGS. 3A-3C, by using the PHY interface 128 that is selectively configurable to support one type or multiple types of memory devices, the IO pin cost can be drastically reduced, as almost all of the IOs can be used for a given product. Thus, the overhead cost for different bonding options is also reduced. It should be noted that the electrical connections for connecting the memory devices to the PHY interface 128 are not limited to bonding. In other embodiments, the electrical connections may be any types of permanent connections, such as bumping, or may be any types of non-permanent connections (such as a mechanical connector that allows a memory device to be detachably coupled to the PHY interface 128).

Figure 4:
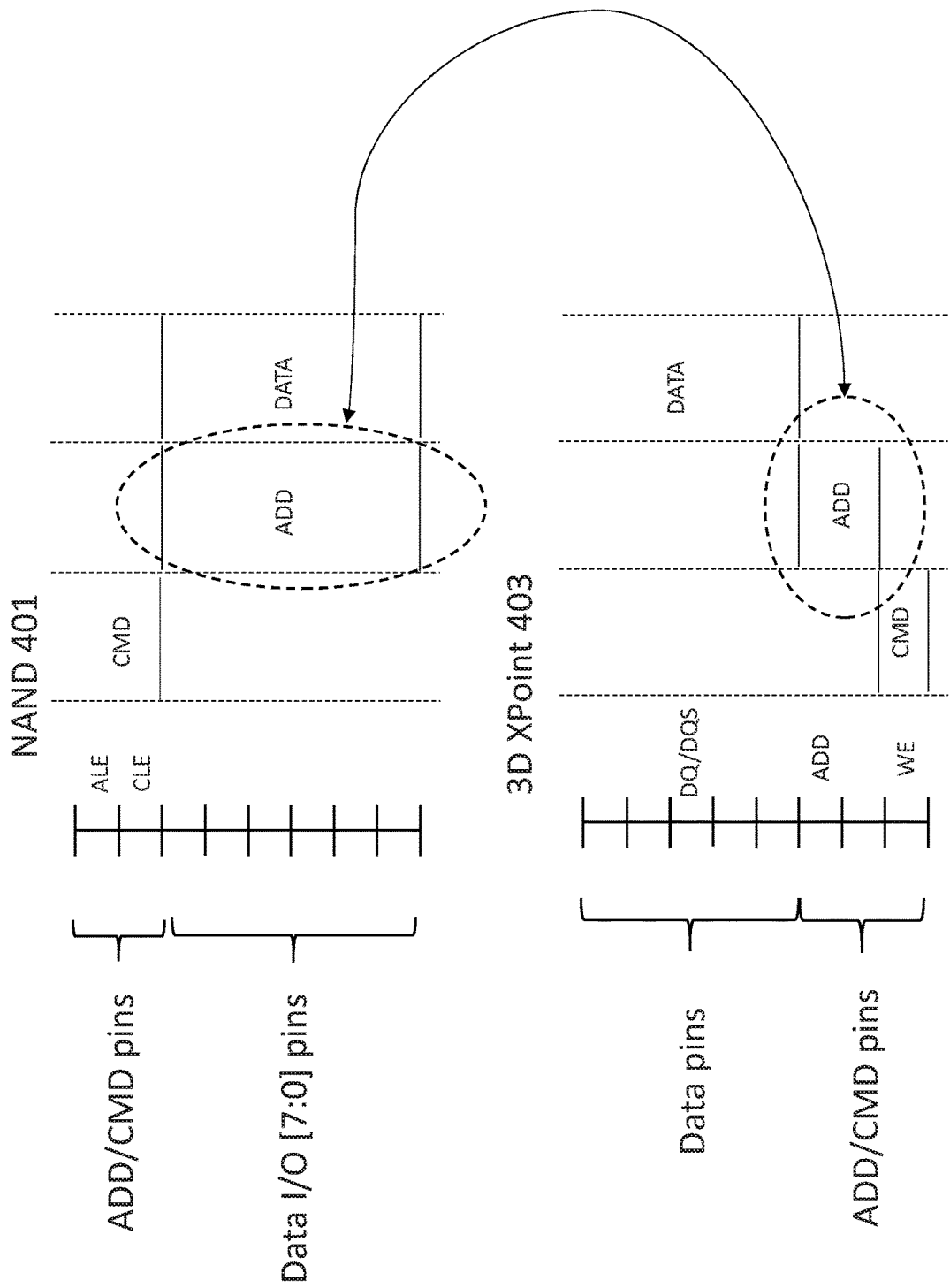
FIG. 4 illustrates an example of a pin configuration for a NAND memory device, and an example of a pin configuration for a 3D XPoint memory device.

It should be noted that different types of memory devices may require different types of pin configurations. FIG. 4 shows an example 401 of a pin configuration for a NAND memory device, and an example 403 of a pin configuration for a 3D XPoint memory device. It should be noted that the example 401 shows only a subset of all of the pins for a NAND memory device, and that a NAND memory device may have additional pins and pins configuration. Similarly, it should be noted that the example 403 shows only a subset of all of the pins for a 3D XPoint memory device, and that a 3D XPoint memory device may have additional pins and pins configuration.

In some cases, a NAND memory device may require 24 hardware pins. Specifically, the NAND memory interface may contain a set of hardware I/O pins and address/command pins (e.g., ALE, CLE, etc.), such as the following:

| Pin | Description |
| --- | --- |
| CE# | Chip enable |
| WE# | Write enable |
| RE# | Read Enable |
| CLE | Command latch enable |
| ALE | Address latch enable |
| I/O [7:0] | Data bus |
| WP# | Write protect |
| R/B# | Ready/busy |

NAND Flash operations may be initiated by issuing a command cycle. This is accomplished by issuing the commands on I/O [7:0], driving CE # LOW and CLE HIGH, and then issuing a WE # clock. Commands, addresses, and data are clocked into the NAND memory device on the rising edge of WE #. Typical commands require a number of address cycles followed by a second command cycle. With the exception of the RESET and READ STATUS commands, new commands should not be issued when the device is busy. For the NAND memory interface, a command is sent through the address/command pins, followed by an address through the I/O pins, and the data through the I/O pins. The sequence of these commands is illustrated in the example 401 of FIG. 4. In addition to the I/O bus, the NAND memory interface may have six major control signals, as follows (the # symbol after a signal indicates that the signal is asserted LOW:

| Symbol | Signal | Description |
| --- | --- | --- |
| ALE | Address latch enable | When ALE is HIGH, addresses are latched into the NAND Flash address register on the rising edge of the WE# signal. |
| CE# | Chip enable | If CE is not asserted, the NAND Flash device remains in standby mode and does not respond to any control signals |
| CLE | Command latch enable | When CLE is HIGH, commands are latched into the NAND Flash command register on the rising edge of the WE# signal. |
| R/B# | Ready/busy# | If the NAND Flash device is busy with an ERASE, PROGRAM, or READ operation, the R/B# signal is asserted LOW. The R/B# signal is open drain and requires a pull-up resistor |
| RE# | Read enable | RE# enables the output data buffers |
| WE# | Write enable | WE# is responsible for clocking data, address, or commands into the NAND Flash device. |

In some embodiments, the PHY interface 128 may be configured with a plurality of channels and sub-channels for implementing the different types of pins for the NAND memory device. In particular, the pins of the PHY interface 128 may be selectively configured so that multiple groups of pins are assigned for respective channels and/or sub-channels. For example, the pins of the PHY interface 128 may be grouped so that every 20 pins form a channel for the NAND memory device. The pins in each channel may also be sub-divided into sub-channels. For example, a channel of 20 pins may be divided into 2 sub-channels, with each channel having 10 pins. The defined channels and/or sub-channels may then be assigned for different types of pins for the NAND memory device. For example, pin(s) in a channel or sub-channel may be assigned to function as ALE pin, and pin(s) in another channel or sub-channel may be assigned to function as CLE pin(s). As another example, pin(s) in a channel or sub-channel may be assigned to function as data pin(s). In general, any of the types of pins for the NAND memory device mentioned above may be implemented using pin(s) in a channel or sub-channel associated with the PHY interface 128. In some cases, a NAND memory device may have at least 4 channels, but may also be expandable to 8, 16, 32, etc., channels, depending on the application. For example, a NAND application for a mobile device may require 4 channels. In such cases, 4 sub-channels may be configured for the PHY interface 128 to meet the 4-channels requirement.

Similarly, the 3D XPoint memory interface may contain a set of data pins (DQ, DQS) and address/command pins (e.g., Add, CTRL, WE, etc.), such as the following:

| Pin | Description |
| --- | --- |
| DQ | Bidirectional read/write data |
| DM | Data Mask |
| DQS | Bidirectional read/write data strobe |
| BA[2:0], A[15:0] | Address |
| CKO/Cko# | Clock |
| ODT, CS#, CKE, RAS#, CAS#, WE# | Command pins |
| PAR_IN, ERR_OUT | Parity |
| SA [2:0], SDA, SCL, Event#, RESET# | Other Pins |

3D XPoint operations may also be initiated by issuing a command cycle. For the 3D XPoint memory interface, a command may be sent through the address/command pins, followed by an address through the data pins, and then data through other data pins. The sequence of these commands is illustrated in the example 403 of FIG. 4.

As similarly discussed, in some embodiments, the PHY interface 128 may be configured with a plurality of channels and sub-channels for implementing the different types of pins for the 3D XPoint memory device. In particular, the pins of the PHY interface 128 may be selectively configured so that multiple groups of pins are assigned for respective channels. The concept of grouping pins into channels and sub-channels for 3D XPoint memory device is similar to that for NAND memory device. However, a main difference is that a single 3D XPoint channel may be twice the bandwidth of a single NAND channel. This means that while a NAND channel may have 20 pins (as an example), a 3D XPoint channel may have 40 pins (as an example). For example, the pins of the PHY interface 128 may be grouped so that every 40 pins form a channel for the 3D XPoint memory device. The pins in each channel may also be sub-divided into sub-channels. For example, a channel of 40 pins may be divided into 2 sub-channels, with each channel having 20 pins. The defined channels and/or sub-channels may then be assigned for different types of pins for the 3D XPoint memory device. For example, pin(s) in a channel or sub-channel may be assigned to function as address (ADD) pin(s), and pin(s) in another channel or sub-channel may be assigned to function as WE pin(s). As another example, pin(s) in a channel or sub-channel may be assigned to function as data pin(s). In general, any of the types of pins for the 3D XPoint memory device mentioned above may be implemented using pin(s) in a channel or sub-channel associated with the PHY interface 128.

As discussed, the PHY interface 128 of the apparatus 120 may be configured to support a plurality of types of memory devices, such as NAND memory device and 3D XPoint memory device. Accordingly, in some cases, a subset of the channels and/or sub-channels of the PHY interface 128 may be assigned for one or more NAND memory device(s), while another subset of the channels and/or sub-channels of the PHY interface 128 may be assigned for one or more 3D XPoint memory device(s). This feature may be advantageous because it allows NAND and 3D XPoint memories to coexist for performance or application reasons. In some embodiments, the dividing of the channels into NAND channels and 3D XPoint channels may be performed statically or dynamically.

In some embodiments, a user of the apparatus 120 may configure the pins of the PHY interface 128 via an application executed on a processor (which may be coupled to the interface controller 130, to the PHY interface 128, and/or an input port for allowing the PHY interface 128 to be user-configured). For example, the application may provide a user interface (for display on a screen), and may receive input from the user so that the user may selectively define channels and/or sub-channels, and may selectively assign pins to different channels and/or sub-channels. In some cases, data regarding the assigned pins may be stored in a medium in the apparatus 120. During operation, based on the pin configuration of the PHY interface 128 assigned by the user, the interface controller 130 may control the multiplexer 126 and the PHY interface 128 so that the NAND memory controller 122 may properly communicate with the NAND memory device(s) 142, and/or the 3D XPoint memory controller 124 may properly communicate with the 3D XPoint memory device(s) 152. For example, during operation, the interface controller 130 may operate the multiplexer 126 and/or the PHY interface 128 based on the data regarding the assigned pins in the medium. Also, control signals from the NAND memory controller 122 and/or the 3D XPoint memory controller 124 may be processed based on the data regarding the assigned pins stored in the medium, so that the control signals can be passed to the correct assigned pins. Similarly, data from the NAND memory device(s) 142 and/or the 3D XPoint memory device(s) 152 are transmitted to certain assigned pins based on the data stored in the medium, and the NAND memory controller 122 and/or the 3D XPoint memory controller 124 recognize that the data are transmitted from the respective NAND memory device(s) 142 and/or the 3D XPoint memory device(s) 152 based on the pin assignment indicated by the data stored in the memory of the apparatus 120.

As discussed, the pins of the PHY interface 128 are generic pins that can be selectively configured (e.g., programmed) to function as specific types of pins based on the type of the memory device. For example, an otherwise generic pin of the PHY interface 128 may be programmed as data pin, DQ/DQS pin, address pin, ALE pin, WE pin, etc. In some embodiments, the assignment of the channels and pins for a specific memory device may be stored in a medium. In some cases, a mapping may be created that maps the pins and/or channels assignments based on the functional purpose of those pins and/or channels. Also, in some embodiments, a mapping may be created to map command pins of one type of memory device (e.g., NAND memory device) to command pins of another type of memory device (e.g., 3D XPoint memory device). In further embodiments, a mapping may be created to map data pins of one type of memory device (e.g., NAND memory device) to data pins of another type of memory device (e.g., 3D XPoint memory device).

Figure 5:
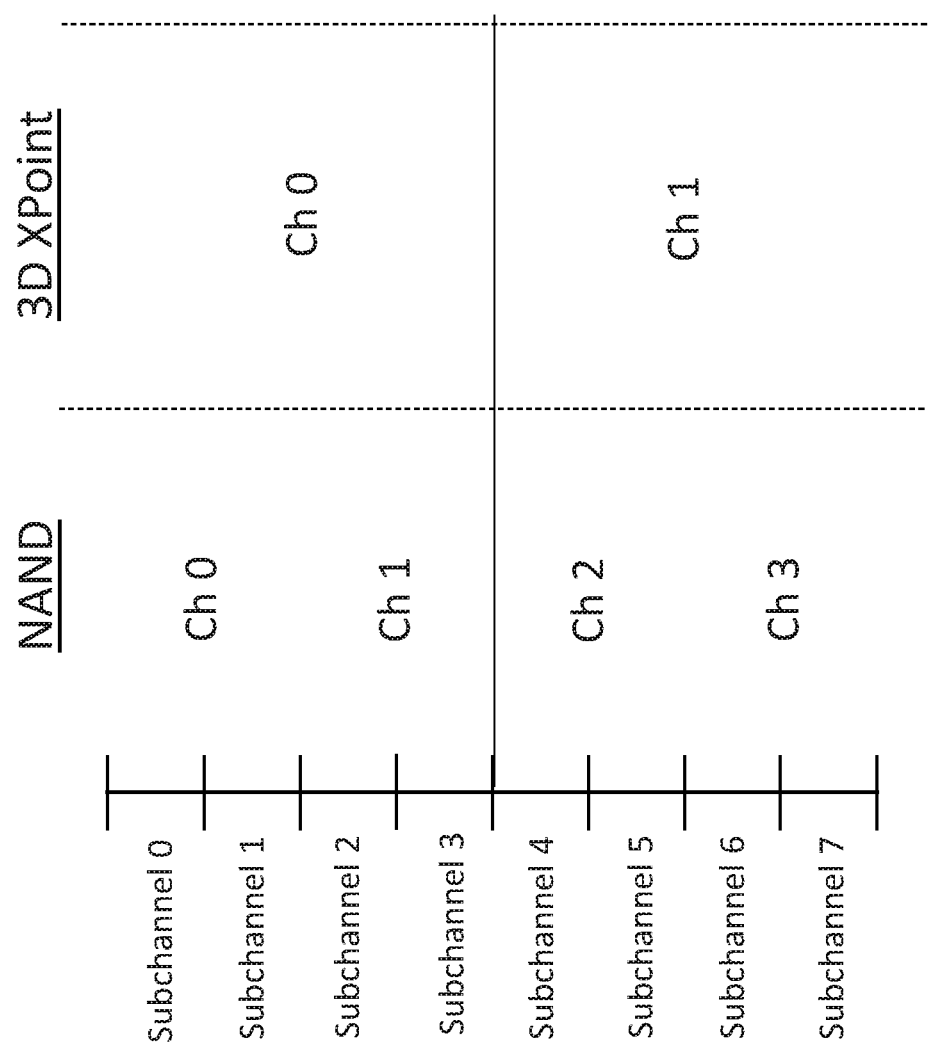
FIG. 5 illustrates the concept of channels and sub-channels.

As discussed, the configuring of the pins of the PHY interface 128 may involve defining channels and sub-channels for one or more groups of pin(s), and then assigning pins in the different channels and/or sub-channels as certain functional pins that are specific for the memory device being incorporated with the apparatus 120. In some cases, to support enough bandwidth for a particular application, at least 2 channels may be defined, and may be expanded into 4 sub-channels. In other embodiments, 4 channels may be defined, and may be expanded into 8 sub-channels. A computing system may need 8 channels for communicating with a memory device. Smaller devices such as mobile devices may need 4 channels for communicating with a memory device. Also, different applications may require different number of pins for a given channel. For example, a NAND channel may require 23 pins. As another example, a 3D XPoint channel may require 40 pins. In other embodiments, the number of pins per channel and/or sub-channel may be arbitrarily defined. FIG. 5 illustrates a concept of channels and sub-channels. As shown in the figure, for a NAND memory device, 4 channels (Ch0-Ch3) may be defined, with each channel having 20 pins. The 4 channels may be further divided into 8 sub-channels. One or more pins in each of the sub-channels may be employed to implement a type of pin(s) required for the operation of the NAND memory device. Similarly, for a 3D XPoint memory device, 2 channels (Ch0-Ch1) may be defined, with each channel having 40 pins. The 2 channels may be further divided into 4 sub-channels. One or more pins in each of the sub-channels may be employed to implement a type of pin(s) required for the operation of the 3D XPoint memory device. For examples, each sub-channel may be selectively configured for I/O pins, ADD/CMD pins, etc. If each sub-channel has 10 pins, then 10 pins of a sub-channel may be assigned to implement the ADD/CMD pins, and another 10 pins of another sub-channel may be assigned to implement the Data I/O pins. Note that not all of the pins in a sub-channel may be used, and that only a subset of the assigned pins in a sub-channel may be used to implement a specific type of pins in some cases. As shown in the figure, 3D XPoint channels are wider than NAND channels because they require more pins.

As discussed in the above example with reference to FIG. 5, the user may configure all 8 sub-channels as 4 NAND channels (e.g., 4 channels of 20 pins each) as one way of utilizing the sub-channels. Also, as discussed, in another way of utilizing the sub-channels, the user may configure all 8 sub-channels to support 2 3D XPoint channels because a single 3D XPoint channel (e.g., 40 pins) may need at least 4 sub-channels of 10 pins each. As a third way of utilizing the sub-channels, the end user may configure the first 4 sub-channels (e.g., 40 pins each) to support 2 channels of NAND (e.g., 2 channels of 20 pins each) and the last 4 sub-channels to support 1 channel of 3D XPoint (e.g., 1 channel of 40 pins). As yet another example, if there are 6 sub-channels, the user may configure the first 2 sub-channels as a NAND channel and configure the remaining 4 sub-channels as a 3D XPoint channel. Alternatively, the user may configure the first 4 sub-channels as a 3D XPoint channel, and configure the last 2 sub-channels as a NAND channel. Accordingly, there are many ways to configure the channels and sub-channels, and any of the channels and sub-channels may be selectively be configured for use as a memory device channel for a certain type of memory device.

In the above embodiments, each channel's and sub-channel's size is identical to each other. In other embodiments, channels with different respective sizes may be defined, and/or sub-channels with different respective sizes may be defined. For example, a first set of sub-channels with a first size may be defined for a first type of memory device, and a second set of sub-channels with a second size (different from the first size) may be defined for a second type of memory device. As another example, a first sub-channel with a first size may be defined to implement a first type of pin for a memory device, and a second sub-channel with a second size (different from the first size) may be defined to implement a second type of pin for the same memory device. Also, in some embodiments, if there are multiple ones of the same type of memory device, the channel and pin assignments for one of the memory devices may be repeated for other additional ones of the memory devices of the same type.

It should be noted that in some embodiments, a "sub-channel" itself may be considered as a channel.

Figure 6:
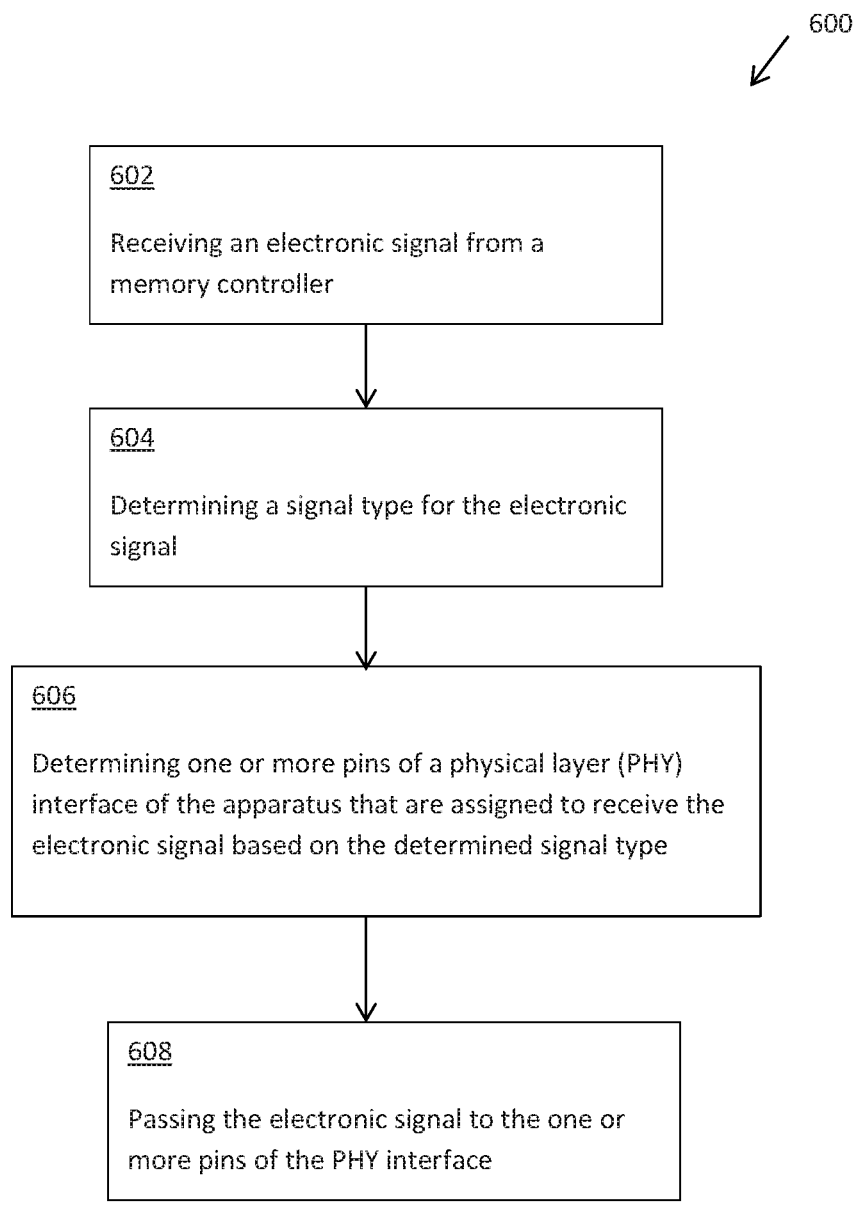
FIG. 6 illustrates a method performed by the apparatus of FIG. 1.

FIG. 6 illustrates a method 600 performed by an apparatus (such as the apparatus 120 of FIG. 1). The method 600 includes: receiving an electronic signal from a memory controller (item 602); determining a signal type for the electronic signal (item 604); determining one or more pins of a physical layer (PHY) interface of the apparatus that are assigned to receive the electronic signal based on the determined signal type (item 606); and passing the electronic signal to the one or more pins of the PHY interface (item 608). In some embodiments, the memory controller may be the NAND memory controller 122. In other embodiments, the memory controller may be the 3D XPoint memory controller 124. Also, in some embodiments, the act of receiving the electronic signal from the memory controller may be performed by the PHY interface and/or an interface controller (e.g., the interface controller 130). In additional, in some embodiments, the act of determining one or more pins of the PHY interface may be performed by the interface controller and/or a component in the PHY interface. Furthermore, in some embodiments, the act of passing the electronic signal to the one or more pins of the PHY interface may be performed by the interface controller, a component in the PHY interface, a multiplexer, a switch, or any combination of the foregoing.

In some embodiments, with respect to the method 600, the electronic signal comprises a read command or a write command.

In some embodiments, with respect to the method 600, the act of determining the one or more pins comprises determining a channel associated with the PHY interface that is assigned to implement a certain type of pin function for a memory device, wherein the one or more pins belong to the channel.

In some embodiments, with respect to the method 600, the electronic signal is for communication with a non-volatile memory device.

In some embodiments, with respect to the method 600, the non-volatile memory device comprises a NAND memory device or a 3D XPoint memory device.

The apparatus 120 described herein is advantageous because it can reduce the IO pin count dramatically while supporting multiple types of memory devices. This is particularly important in the IO limited design, such as product that includes SSD.

The selectively configurable feature of the PHY interface 128 is also advantageous over a technique that provides additional memory device-specific PHY interface(s). If additional device-specific PHY interface(s) are added to the same silicon die to support different types of memory interfaces, and if some of the additional PHY interfaces ended up not being used, then significant amount of die area and also pins may be wasted. This approach is also unduly expensive as the die size needs to be increased to accommodate the un-used PHY/IOs die area. Furthermore, it is especially costly for input/output (IO) limited designs (such as solid-state drive (SSD) products, which usually have a high pin count), to include additional PHY interfaces taking up die area while not being used. On the other hand, the PHY interface 128 will not be un-used because no matter what types of memory devices are used with the apparatus 120, or no matter what combination of memory devices are used with the apparatus 120, the same PHY interface 128 is always used to connect with the memory devices.

It should be noted that the types of memory devices for which the apparatus 120 may be employed are not limited to NAND memory devices and 3D XPoint memory devices, and that the apparatus may be employed for other types of memory devices, such as any type of hard disk drive (HDD), any type of solid-state drive (SSD), or other types of non-volatile memories (such as MRAM, ReRAM, PC RAM, FeRAM, etc.).

Specialized Processing System

Figure 7:
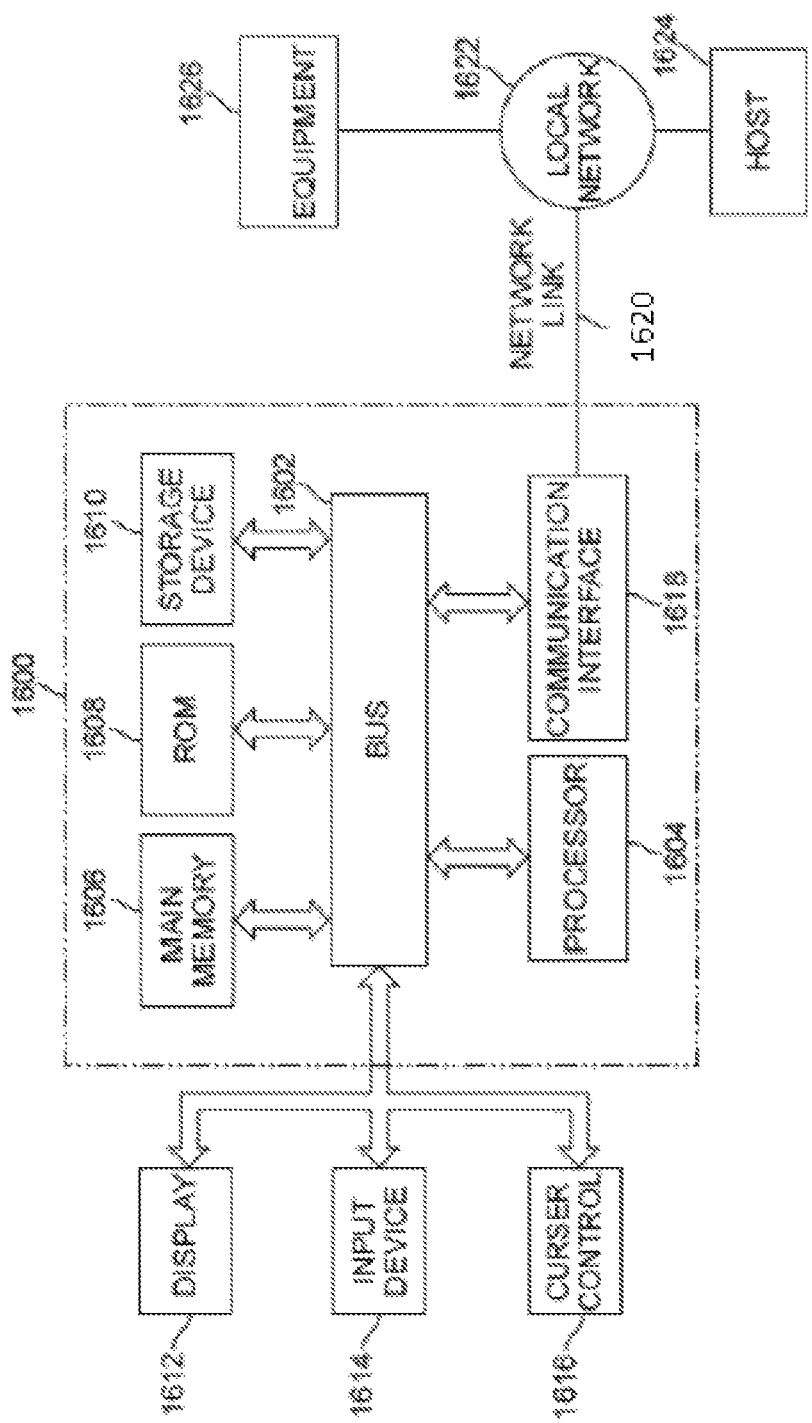
FIG. 7 illustrates an example of a specialized processing system that includes the apparatus of FIG. 1.

FIG. 7 is a block diagram illustrating an embodiment of a specialized processing system 1600 that may include any of the features described herein. For example, the processing system 1600 may include the apparatus 120 described herein.

Referring to FIG. 7, the processing system 1600 includes a bus 1602 or other communication mechanism for communicating information, and a processor 1604 coupled with the bus 1602 for processing information. The processor system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk or optical disk, is provided and coupled to the bus 1602 for storing information and instructions.

In some embodiments, the storage device may be NAND memory device(s), 3D XPoint memory device(s), or a combination of both NAND memory device(s) and 3D XPoint memory device(s). In other embodiments, the storage device may be any of other types of memory devices.

The processor system 1600 may be coupled via the bus 1602 to a display 1612, such as a cathode ray tube (CRT), for displaying information to a user. An input device 1614, including alphanumeric and other keys, is coupled to the bus 1602 for communicating information and command selections to processor 1604. Another type of user input device is cursor control 1616, such as a mouse, a trackball, or cursor direction keys for communicating direction information and command selections to processor 1604 and for controlling cursor movement on display 167. This input device typically has two degrees of freedom in two axes, a first axis (e.g., x) and a second axis (e.g., y), that allows the device to specify positions in a plane.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes coaxial cables, copper wire and fiber optics, including the wires that comprise the bus 1602. Transmission media can also take the form of acoustic or light waves, such as those generated during radio wave and infrared data communications.

Common forms of processor-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a magnetic disk of a remote computer. The remote computer can load the instructions into its dynamic memory and send the instructions over a telephone line using a modem. A modem local to the processing system 1600 can receive the data on the telephone line and use an infrared transmitter to convert the data to an infrared signal. An infrared detector coupled to the bus 1602 can receive the data carried in the infrared signal and place the data on the bus 1602. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be an integrated services digital network (ISDN) card or a modem to provide a data communication connection to a corresponding type of telephone line. As another example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. An apparatus comprising:
   a first memory controller that corresponds with a first type of non-volatile memory device;
   a second memory controller that corresponds to a second type of non-volatile memory device, wherein the second type of non-volatile memory device is different from the first type of non-volatile memory device;

an physical layer (PHY) interface; and
an interface controller coupled to the PHY interface for controlling signal transmission by the PHY interface;
wherein the PHY interface is selectively configurable or is user-configured to allow the PHY interface to communicate with one or more memory devices belonging to the first type, the second type, or both;
wherein both the first memory controller corresponding with the first type of non-volatile memory device and the second memory controller corresponding with the second type of non-volatile memory device are implemented on a same chip, and wherein the first memory controller and the second memory controller are different from each other.

2. The apparatus of claim 1, wherein the PHY interface comprises pins that are selectively assignable or selectively assigned to operate as a type of pin specific to the first type of non-volatile memory device, or to the second type of non-volatile memory device.

3. The apparatus of claim 1, wherein the PHY interface comprises registers configured to allow functionalities of pins of the PHY interface to be programmed.

4. The apparatus of claim 1, wherein the interface controller is configured to control the signal transmission by the PHY interface based on a manner in which pins of the PHY interface is configured.

5. The apparatus of claim 1, further comprising a switch or a multiplexer coupled to the interface controller, wherein the interface controller is configured to control the switch or the multiplexer.

6. The apparatus of claim 1, wherein the first type of non-volatile memory device is a NAND memory device.

7. The apparatus of claim 1, wherein the second type of non-volatile memory device is a 3D XPoint memory device.

8. The apparatus of claim 1, wherein the PHY interface comprises a plurality of channels that are selectively configurable or configured.

9. The apparatus of claim 1, wherein the first memory controller, the second memory controller, and the PHY interface are integrated into an integrated circuit (IC) chip.

10. The apparatus of claim 1, wherein the one or more memory devices comprise a 3D XPoint memory device, a NAND memory device, or both.

11. A system comprising the apparatus of claim 1, and the one or more memory devices.

12. The system of claim 11, wherein the one or more memory devices comprise a 3D XPoint memory device, a NAND memory device, or both.

13. The system of claim 11, wherein the one or more memory devices are connected to the PHY interface via electrical connections.

14. An apparatus comprising:
a first memory controller that corresponds with a first type of non-volatile memory device;
a second memory controller that corresponds to a second type of non-volatile memory device, wherein the second type of non-volatile memory device is different from the first type of non-volatile memory device;
an physical layer (PHY) interface; and
an interface controller coupled to the PHY interface for controlling signal transmission by the PHY interface;
wherein the interface controller is configured to control signal transmission by the PHY interface based on a manner in which pins of the PHY interface is configured by a user;
wherein both the first memory controller corresponding with the first type of non-volatile memory device and the second memory controller corresponding with the second type of non-volatile memory device are implemented on a same chip, and wherein the first memory controller and the second memory controller are different from each other.

15. The apparatus of claim 14, wherein the PHY interface comprises pins that are selectively assignable or selectively assigned to operate as a type of pin specific to the first type of non-volatile memory device, or to the second type of non-volatile memory device.

16. The apparatus of claim 14, wherein the PHY interface comprises registers configured to allow functionalities of pins of the PHY interface to be programmed.

17. The apparatus of claim 14, further comprising a switch or a multiplexer coupled to the interface controller, wherein the interface controller is configured to control the switch or the multiplexer.

18. The apparatus of claim 14, wherein the first type of non-volatile memory device is a NAND memory device.

19. The apparatus of claim 14, wherein the second type of non-volatile memory device is a 3D XPoint memory device.

20. The apparatus of claim 14, wherein the PHY interface comprises a plurality of channels that are selectively configurable or configured.

21. The apparatus of claim 14, wherein the first memory controller, the second memory controller, and the PHY interface are integrated into an integrated circuit (IC) chip.

22. The apparatus of claim 14, wherein the pins of the PHY interface is configured by the user to communicate with one or more memory devices.

23. The apparatus of claim 22, wherein the one or more memory devices comprise a 3D XPoint memory device, a NAND memory device, or both.

24. A system comprising the apparatus of claim 22, and the one or more memory devices.

25. The system of claim 24, wherein the one or more memory devices comprise a 3D XPoint memory device, a NAND memory device, or both.

26. The system of claim 24, wherein the one or more memory devices are connected to the PHY interface via electrical connections.

27. A method performed by an apparatus, comprising:
receiving an electronic signal from a memory controller;
determining a signal type for the electronic signal;
determining one or more pins of a physical layer (PHY) interface of the apparatus that are assigned to receive the electronic signal based on the determined signal type; and
passing the electronic signal to the one or more pins of the PHY interface, wherein the PHY interface is designed to be physically connectable with different types of memory devices,
wherein the memory controller is a part of the apparatus that also includes an additional memory controller, and wherein the memory controller and the additional memory controller are different from each other.

28. The method of claim 27, wherein the electronic signal comprises a read command or a write command.

29. The method of claim 27, wherein the act of determining the one or more pins comprises determining a channel associated with the PHY interface that is assigned to implement a certain type of pin function for one of the types of memory devices, wherein the one or more pins belong to the channel.

30. The method of claim 27, wherein the electronic signal is for communication with a non-volatile memory device.

31. The method of claim 30, wherein the non-volatile memory device comprises a NAND memory device or a 3D XPoint memory device.

32. An apparatus comprising:
a first memory controller that corresponds with a first type of non-volatile memory device;
a second memory controller that corresponds to a second type of non-volatile memory device, wherein the second type of non-volatile memory device is different from the first type of non-volatile memory device;
an physical layer (PHY) interface; and
an interface controller coupled to the PHY interface for controlling signal transmission by the PHY interface;
wherein the PHY interface is selectively configurable or is user-configured to allow the PHY interface to communicate with one or more memory devices belonging to the first type, the second type, or both;
wherein both the first memory controller corresponding with the first type of non-volatile memory device and the second memory controller corresponding with the second type of non-volatile memory device are implemented on a same chip; and
wherein the PHY interface is designed to be physically connectable with the first type of non-volatile memory device, and to be physically connectable the second type of non-volatile memory device.

33. An apparatus comprising:
a first memory controller that corresponds with a first type of non-volatile memory device;
a second memory controller that corresponds to a second type of non-volatile memory device, wherein the second type of non-volatile memory device is different from the first type of non-volatile memory device;
an physical layer (PHY) interface; and
an interface controller coupled to the PHY interface for controlling signal transmission by the PHY interface;
wherein the interface controller is configured to control signal transmission by the PHY interface based on a manner in which pins of the PHY interface is configured by a user;
wherein both the first memory controller corresponding with the first type of non-volatile memory device and the second memory controller corresponding with the second type of non-volatile memory device are implemented on a same chip; and
wherein the PHY interface is designed to be physically connectable with the first type of non-volatile memory device, and to be physically connectable with the second type of non-volatile memory device.

34. The apparatus of claim 1, wherein a physical configuration of the PHY interface remains the same regardless of whether a first memory device belonging to the first type, or a second memory device belonging to the second type, is connected with the PHY interface, the first memory device and the second memory device having different respective interface connections.

35. The apparatus of claim 14, wherein a physical configuration of the PHY interface remains the same regardless of whether a first memory device belonging to the first type, or a second memory device belonging to the second type, is connected with the PHY interface, the first memory device and the second memory device having different respective interface connections.

* * * * *